Patented Apr. 5, 1938

2,113,357

UNITED STATES PATENT OFFICE 2,113,357

BASICALLY SUBSTITUTED AMINO-ACRIDINE DERIVATIVES

Fritz Mietzsch, Wuppertal-Elberfeld, and Hans Mauss, Wuppertal-Barmen, Germany, assignors to Winthrop Chemical Company, Inc., New York, N. Y., a corporation of New York No Drawing. Application August 7, 1936, Serial No. 94,876. In Germany May 9, 1930

9 Claims. (Cl. 260—36)

The present invention relates to new basically substituted acridine derivatives and to a process of preparing the same.

U. S. Patents Nos. 1,760,781, 1,766,403 and 1,889,704 describe processes for the manufacture of amino-acridines and substitution products thereof containing basic radicals as substituents in the aromatic amino group. These acridine derivatives are distinguished by their remarkable efficacy to blood parasites.

In accordance with the present invention new 9-amino-acridines are produced which contain basic substituents in the amino group and a halogen atom or an alkyl group in the 6-position and which may contain a halogen atom, an alkyl- or an alkoxy group in the 2-position, more particularly acridine derivatives of the formula:

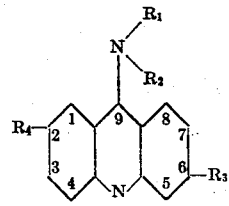

wherein $R_1$ stands for an organic basic radical containing nitrogen, $R_2$ stands for hydrogen, an alkyl group or an organic basic radical containing nitrogen, $R_3$ stands for a halogen atom or an alkyl group and $R_4$ stands for hydrogen, a halogen atom or an alkyl- or alkoxy group. These new compounds are markedly distinguished from the already described nuclear substitution products of the amino acridines containing basic substituents attached to the aromatic nitrogen, inasmuch as they display a particularly favorable ratio between therapeutic and toxic action, whereby it is essential that the new acridine compounds do not contain nitro groups. They exert a specific activity against the schizont form of the malaria parasites.

The process of manufacture of the new 9-amino-acridines which are basically substituted in the amino group and contain a halogen atom or an alkyl group in the 6-position and which may contain a halogen atom, an alkyl- or an alkoxy group in the 2-position is by causing bases or salts thereof, containing at least two basic nitrogen atoms, one of which is in a primary or secondary amino group, to react with such acridine substitution products as contain in the 9-position a replaceable substituent and in the 6-position a halogen atom or an alkyl group, and which may be substituted in the 2-position by a halogen atom, an alkyl- or an alkoxy group. Such replaceable substituents in the 9-position are, for example, ether and ester-like groups, such as halogen-, aryloxy-, alkoxy-, aryl- and alkyl-mercapto groups.

Accordingly the reaction performed in the said process may be represented by the following general equation:

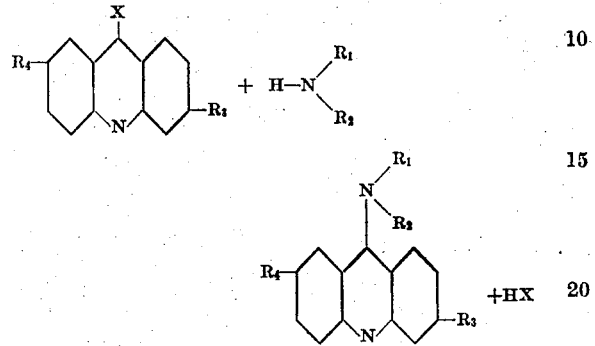

wherein $R_1$, $R_2$, $R_3$ and $R_4$ stand for one of the above indicated substituents and X stands for a replaceable ether- or ester-like bound substituent of the group consisting of halogen atoms, aryloxy-, alkoxy-, aryl- and alkyl mercapto groups which have proved equivalent as replaceable substituents in our present process. The acridine substitution products used as starting materials in the said process may be prepared, for example, in accordance with the directions of our U. S. Patent 1,855,302.

The reaction is preferably performed in phenolic solution while heating advantageously on the water bath, whereby sometimes the 9-phenyl-ether of the acridine derivative formed as intermediate product separates, which again is dissolved when entering into reaction with the amino compound added.

Likewise other organic substances containing hydroxyl or sulfhydryl groups have proved to be suitable solvents in the present process, for example, ethylalcohol, glycol, amylalcohol, cresol, naphthol, thiophenol and the like. The reaction temperature is advantageously about 130° C. when using these substances as solvents, whereby, if necessary, the reaction is performed in pressure vessels. Presumably, when using the 9-halogen-derivatives as starting materials the reaction sometimes takes place with the formation of acridines containing the radical of the solvent used in ether or thioether-like linkage in the 9-position as intermediate products.

The reaction is complete after heating for about one to several hours. The new base formed may be separated off by rendering the reaction mixture alkaline and taking up the base precipitated in an organic solvent, such as ether, methylene chloride or the like.

As basically substituted amines used as starting components primary or secondary amines have proved equivalent in the present process, which are substituted by aliphatic, alicyclic, aromatic or heterocyclic radicals displaying, owing to their content of one or more nitrogen atoms, a distinctly basic character. The radicals may further contain substituents, for example, the hydroxyl group and ether- or thioether-like linkages as specifically described in the numerous examples. Especially those compounds as contain basic radicals constituted of aliphatic radicals, such as, for example, the diethyl-amino-ethylamino- or the α-diethylamino-δ-pentylamine-radical, are distinguished by their valuable properties in the therapeutic use.

It may be mentioned that for the introduction of the basic radical into the acridine derivative, bases can likewise be used in which, for example, one of the amino groups is occupied by a radical, which can easily be split off, for example, an acyl radical, the acid radical being then subsequently split off in the known manner. The introduction of the basically substituted amine into the 9-position can also be carried out by building up the basic radical in several steps, for example, by causing an amino alcohol or an amino-substituted halogen compound to act on a substitution product of acridine of the kind specified and converting the acridine compounds produced in this manner, containing in the 9-amino group a halogenated or hydroxylated radical (if necessary, after esterification of the hydroxyl group, for example, by means of a hydrogen halide acid) by means of primary or secondary amines into the corresponding substitution products of 9-amino-acridine containing a basic radical in the amino group.

Instead of starting from acridines, containing in the 9-position a replaceable substituent and in the 6-position a halogen atom or an alkyl group and which can be substituted in the 2-position by a halogen atom, an alkyl or alkoxy group, there can also be used as starting material, such acridine compounds as contain in addition to the replaceable substituents in the 9-position a substituent in the 6-position which can be converted into a halogen atom or an alkyl group by known methods and which may, at the same time, contain in the 2-position instead of halogen, alkyl or alkoxy, a substituent which can be converted into those groups or into hydrogen. Such substituents are primarily halogen atoms, hydroxyl-, nitro- and amino groups.

The new acridine derivatives are in the form of the free bases light yellow, crystalline substances, melting at about 100° C. and soluble in the usual organic solvents, for example, ether, alcohol, acetone, benzene, methylenechloride and the like, insoluble in water, but soluble in diluted mineral and organic acids, such as hydrochloric, hydrobromic, sulfuric, formic, acetic, citric, tartaric, lactic, oxalic acid and the like. The salts of the new acridine bases with acids are obtainable in the customary manner. They are soluble in water and contain two equivalents of the acid on one mol. of the base. In general they decompose at about 250° C. and fluoresce in aqueous solution.

The invention is illustrated by the following examples without being restricted thereto:

*Example 1*

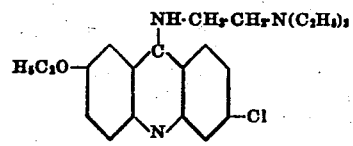

29.2 grams of 2-ethoxy-6.9-dichloro-acridine (obtainable in accordance with U. S. Patent 1,855,302) are dissolved in 120 grams of phenol at the temperature of the water bath. Without paying regard to the separation of the 9-phenyl-ether thereby produced 11.6 grams of 2-diethyl-amino-1-aminoethane are added gradually. After stirring for one hour at 100° C. the reaction is complete. In order to remove the phenol the cooled mass is introduced into 2N-caustic soda, whereupon the 9-(diethyl-amino-ethyl-amino)-2-ethoxy-6-chloro-acridine is precipitated in a semi-solid form and is advantageously dissolved in ether. It is readily soluble in most organic solvents. Further purification is carried out by shaking the ethereal solution with dilute acetic acid, reprecipitating with ammonia and redissolving in ether. By means of an ethereal solution of hydrochloric acid there is obtained a hydro-chloride, which is readily soluble in water with a reaction neutral to Congo red and can be recrystallized from alcohol.

*Example 2*

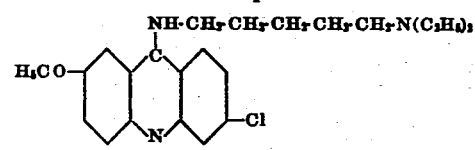

27.8 grams of 2-methoxy-6.9-dichloroacridine are caused to react in 120 grams of phenol with 15.8 grams of diethyl-amino-1-aminopentane as described in Example 1. The isolation and purification of the new base is likewise carried out as in Example 1. This purification has for its object the complete removal of the acridone which is always produced in the reaction. The base is distinguished by its solubility in ether. The yellow hydrochloride thereof, which is soluble in water with a reaction neutral to Congo red, can be obtained in the form of a fine crystalline powder by dissolving in methanol and precipitating with ether; it decomposes at 258–260° C.

*Example 3*

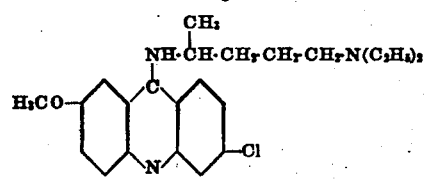

15.8 grams of 5-diethylamino-2-aminopentane are dropped in the course of one hour at 100° C. into a solution of 27.8 grams of 2-methoxy-6.9-dichloro-acridine in 120 grams of phenol. The isolation of the base, which is readily soluble in ether, is carried out as described in Example 1. The di-hydrochloride thus obtained decomposes at 248–250° C.

In an analogous manner by starting from 2-methoxy-6-bromo-9-chloroacridine (compare U.S. Patent No. 1,855,302) and α-diethyl-amino-δ-aminopentane, the 2-methoxy-6-bromo-9-(α-diethylamino-δ-pentylamino)-acridine forming a hydrochloride, readily soluble in water, which decomposes at 240–245° C., is obtained.

From 2-methoxy-6-iodo-9-chloracridine (compare U. S. Patent 1,855,302) and α-diethylamino-δ-aminopentane the 2-methoxy-6-iodo-9-(α-diethylamino-δ-pentylamino)-acridine is obtained, the dihydrochloride of which is purified by precipitating by means of ether from its methylalcoholic solution. A powder readily soluble in water with a neutral reaction is obtained which decomposes at 240–245° C.

*Example 4*

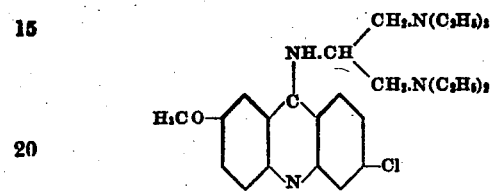

27.8 grams of 2-methoxy-6.9-dichloro-acridine are dissolved in 120 grams of phenol and into this solution are dropped at 100° C. with vigorous stirring 20.1 grams of 1.3-tetraethyldiamino-2-aminopropane (mobile colorless liquid, boiling under 8 mm. pressure at 100–102° C.), obtainable by the action of potassium phthalimide on 1.3-tetraethyldiamino-2-chloropropane (boiling under 13 mm. pressure at 112–113° C.) and subsequent saponification of the condensation product. The reaction is complete in the course of one hour. Working up follows as in Example 1. The new base dissolves readily in ether and yields with an ethereal solution of hydrochloric acid a yellow hydrochloride, which decomposes at 225–228° C., and is readily soluble in water.

*Example 5*

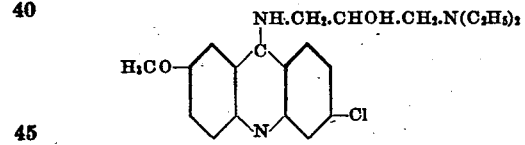

14.6 grams of 3-diethylamino-2-hydroxy-1-aminopropane are stirred at 100° C. in the course of one hour into 27.8 grams of 2-methoxy-6.9-dichloro-acridine, dissolved in 120 grams of phenol. The new base is somewhat sparingly soluble in ether and is advantageously extracted by means of methylene chloride or chloroform. By dissolving in benzene and precipitating with petroleum ether it can be obtained as a yellow powder, which melts at 105–106° C. The yellow hydrochloride thereof dissolves in water with a reaction neutral to Congo red and can be crystallized from alcohol. It was found to decompose at 238–240° C.

In an analogous manner are obtained:

(a) By employing α-dimethylamino-γ-aminopropane (boiling point 36° C. under 10 mm. pressure) as base, 2-methoxy-6-chloro-9-(α-dimethylamino-γ-propylamino)-acridine-dihydrochloride, decomposing at 255° C.

(b) By employing α-diethylamino-γ-aminobutane (boiling point 61° C. under 8 mm. pressure) as base, 2-methoxy-6-chloro-9-(α-diethylamino-γ-butylamino)-acridine-dihydrochloride, decomposing at 258–260° C.

(c) By employing α-diallylamino-γ-aminobutane (boiling point 75° C. under 4 mm. pressure) as base, 2-methoxy-6-chloro-9-(α-diallylamino-γ-butylamino)-acridine-dihydrochloride, decomposing at 208–210° C.

(d) By employing α-diallylamino-β-aminoethane (boiling point 68–70° C. under 8 mm. pressure) as base, 2-methoxy-6-chloro-9-(α-diallylamino-β-ethylamino)-acridine-dihydrochloride, decomposing at 210–212° C.

(e) By employing α-methylamino-γ-aminobutane (boiling point 41° C. under 10 mm. pressure) as base, 2-methoxy-6-chloro-9-(α-methylamino-γ-butylamino)-acridine-dihydrochloride, decomposing at 210–212° C.

*Example 6*

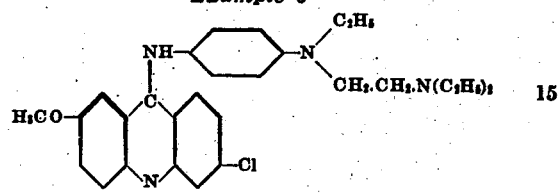

27.8 grams of 2-methoxy-6.9-dichloroacridine are condensed in 120 grams of phenol at 100° C. with 23.5 grams of 4-amino-1-N-(ethyldiethylaminoethyl)-aminobenzene. After working up in the customary manner the base remains as a reddish brown powder, melting at 96–99° C. (not sharp). It yields a reddish brown hydrochloride, which dissolves readily in water with a red coloration, decomposes at 255–258° C. and can be crystallized with alcohol, forming lustrous reddish brown scales.

The 4-amino-1-N-(ethyldiethylaminoethyl)-aminobenzene can be obtained as a water white, mobile oxidizable liquid (boiling at 170–172° C. under 7 mm. pressure) by introducing the nitroso group into N-(ethyl-diethyl-aminoethyl)-aminobenzene and subsequent reduction.

*Example 7*

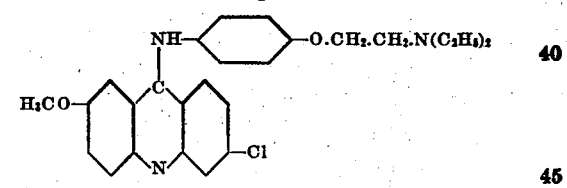

This compound is readily obtainable by causing 27.8 grams of 2-methoxy-6.9-dichloroacridine to react in 120 grams of phenol at 100° C. with 20.8 grams of 4-amino-1-diethylamino-ethoxybenzene. The new base melts at 78–80° C. (not sharp) and yields a hydrochloride, which can be crystallized from alcohol and decomposes at 236–238° C.

The 4-amino-1-diethylamino-ethoxybenzene is obtained as colorless oil boiling at 163–164° C. under 7 mm. pressure from the corresponding nitro compound by reduction with iron and acetic acid.

In an analogous manner the hydrochloride of 2-methoxy-6-chloro-9-(4'-diethylaminoethylmercapto-phenylamino)-acridine, decomposing at 240–242° C., is obtained when employing 4-amino-diethylaminoethylmercapto-benzene (boiling point 149–150° C. under 1 mm. pressure) is used as basic component in the above process.

*Example 8*

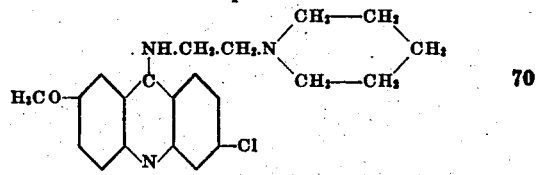

27.8 grams of 2-methoxy-6.9-dichloro-acridine are in the customary manner caused to react in 120 grams of phenol with 12.8 grams of 2-piperi-dine-1-aminoethane (compare Gabriel, Ber. 24, page 1,121). The new base, which on working up separates in a solid form, can be readily recrystallized from alcohol and then forms small yellow matted needles, melting at 139–140° C., which dissolve somewhat difficultly in ether, but more readily in methylene chloride. The yellow dihydrochloride can be crystallized from alcohol and dissolves in cold water with some difficulty more readily in hot water. It decomposes at 260–263° C.

Example 9

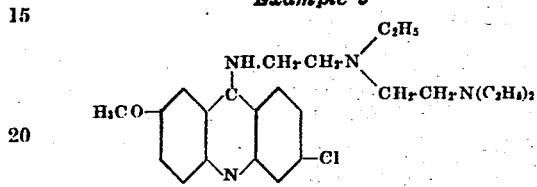

14 grams of 2-methoxy-6.9-dichloro-acridine are heated for half an hour to 100° C. in 60 grams of phenol and after cooling introduced slowly with stirring into 300 ccs. of acetone. The hydrochloride of 2-methoxy-6-chloro-9-phenoxy-acridine thereupon separates as a yellowish powder. It is decomposed with dilute ammonia and the free base is crystallized from benzene and petroleum ether. The 2-methoxy-6-chloro-9-phenoxy-acridine forms small pale yellow crystals, melting at 152–153° C. and is readily soluble in the customary solvents.

33.6 grams of 2-methoxy-6-chloro-9-phenoxy-acridine and 18.7 grams of the triamine of the formula

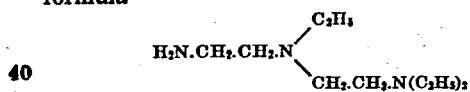

are melted in 120 grams of phenol for one hour at 100° C. The new base, which is obtained in the customary manner is yellow in color, dissolves readily in organic solvents and is converted by an ethereal solution of hydrochloric acid into a yellow hydrochloride, which dissolves very readily in water and decomposes at 225–228° C. The hydrochloride can be crystallized from alcohol.

When using as starting material instead of the 2-methoxy-6-chloro-9-phenoxy-acridine equivalent quantities of, for example, 2-methoxy-6-chloro-9-methoxy-acridine (melting point 158° C.) or of 2-methoxy-6-chloro-9-β-naphthoxy-acridine (melting point 206–207° C.) or of 2-methoxy-6-chloro-9-para-tolyl - mercapto-acri-dine (melting point 155–156° C.) the same product is obtained as above described. In this connection it may be said that acridine-derivatives substituted in the 9-position by the various radicals of the kind above mentioned have quite generally proved equivalent in the present process.

Instead of phenol used as solvent in the above process likewise, for example, other alcohols, phenols or thiophenols, amylalcohol, glycol, cyclohexanol, cresol, naphthol, thiophenol and the like may be employed.

The aliphatic triamine used as starting material in the above process can be obtained by heating 2-diethyl-amino - 1 - ethylaminoethane with bromoethyl-phthalimide in xylene and subsequently splitting off the phthalic acid residue by heating with caustic soda and then with hydrochloric acid. It is a water white, extremely strongly basic liquid, which boils at 120° C. under 11 mm. pressure.

Example 10

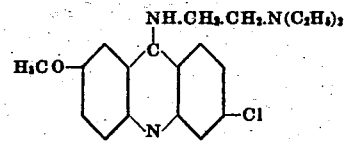

27.8 grams of 2-methoxy-6.9-dichloro-acridine are caused to react in the customary manner in 120 grams of phenol with 12.2 grams (two molecular proportions) of aminoethyl alcohol, whereby 2-methoxy-6-chloro-9-hydroxyethylamino - acri-dine is produced in a satisfactory yield. This new compound can be crystallized from alcohol and yields small yellow matted needles, melting at 191–192°. It is moderately soluble in most solvents. On boiling the benzene solution with thionyl chloride on the water bath 2-methoxy-6-chloro-9-chloroethylamino-acridine is readily obtained as a deep yellow powder, which in its turn reacts with diethylamine to form 2-methoxy-6-chloro-9-diethylaminoethylamino-acridine. The base can be crystallized from benzine in the form of yellow leaflets melting at 117–118° C. The yellow hydrochloride thereof is readily soluble in water and decomposes at 251–252° C.

Furthermore, the same product is obtained when a basically substituted 2-alkoxy-6-nitro-9-aminoacridine is transformed into the 6-chloro-compound by way of the 6-amino-compound. For this purpose molecular quantities of 2-methoxy-6-nitro-9-chlor-acridine (from benzene yellow crystals of the melting point of 214–215° C., obtained from 4'-methoxy-3-nitro-diphenyl-amine-6-carboxylic acid of the melting point of 235–236° C.) and of β-diethylamino-α-amino-ethane are condensed after dissolving in phenol to 2 - methoxy-6-nitro-9-diethylaminoethylami-no-acridine. After purifying by way of the hydrochloric acid salt the base crystallizes from benzene in red bright crystals of the melting point of 136–138°. Its orange colored hydrochloride decomposes at 240–242°.

By reduction with iron and acetic acid in the customary manner the base is transformed into the 2-methoxy-6-amino-9-diethylaminoethylam-ino-acridine. Its yellow hydrochloride decomposes at 215–218° C. and is readily soluble in water. The solution of the free base fluoresces in a remarkable manner. On diazotizing the amino compound a deep red solution is obtained which yields on treating with cuprous chloride according to the Sandmeyer reaction the 2-methoxy-6 - chloro - 9 - diethylaminoethylamino-acridine of the above indicated properties.

Example 11

24.8 grams of 6.9-dichloro-acridine are melted on a boiling water bath with 125 grams of phenol and 17 grams of α-diethylamino-δ-aminopentane are dropped into the melt. After heating for 2 hours to 90–100° C. the reaction mixture is introduced into 1000 ccs. of twice normal caustic soda and the base which separates is extracted by means of ether. The base is purified by extracting the ethereal solution with 10% acetic acid and treating the solution in acetic acid with potassium carbonate; finally, it is freed by steam distillation from the last traces of the excess of aliphatic diamine. From the well dried ethereal solution the dihydrochloride of 6-chloro-9-(α-diethylamino-δ-pentylamino)-acridine is precipitated by means of ethereal hydrochloric acid, which, by crystallization from a little alcohol, is obtained in yellow crystals, decomposing at 234–236° C.

In a similar manner, by employing α-diethylamino-γ-aminobutane as base, 6-chloro-9-(α-diethylamino-γ-butylamino)-acridine, decomposing at 240° C., is obtained.

The hitherto unknown 6.9-dichloroacridine (crystallizing from benzene in small, pale yellow crystals melting at 167–168° C.) is obtained from 3-chloro-diphenylamine-6-carboxylic acid (crystallizing from alcohol in prisms melting at 200–201° C.) by ring closure and chlorination.

In an analogous manner there is obtained:

(a) From 2-methyl-6.9-dichloroacridine, 2-methyl-6-chloro-9-(α-diethylamino-δ-pentylamino)-acridine, the yellow dihydrochloride of which, when crystallized from a mixture of alcohol and ether, decomposes at 245–246° C.

For the production of 2-methyl-6.9-dichloroacridine, 2.4-dichlorobenzoic acid is condensed with 4-toluidine to 4'-methyl-3-chloro-diphenylamine-6-carboxylic acid (when crystallized from alcohol melting at 232–233° C.), this compound is subjected to ring closure and chlorinated. The 2-methyl-6.9-dichloro-acridine forms when crystallized from benzene pale yellow colored needles, melting at 146–147° C.

(b) From 2.6.9-trichloracridine, 2.6-dichloro-9-(α-diethylamino-δ-pentylamino)-acridine. By crystallization from methylalcohol and ether a yellow hydrochloride is produced, which is readily soluble in water with a reaction neutral to Congo red.

For the production of 2.6.9-trichloro-acridine, 2.4-dichlorobenzoic acid is condensed with 4-chloroaniline to 3.4'-di-chloro-diphenylamino-6-carboxylic acid (when crystallized from alcohol decomposing at 236–237° C.), this compound is subjected to ring closure and chlorinated. The 2.6.9-trichloro-acridine forms on crystallizing from benzene small pale yellow colored crystals, melting at 202–203° C.

(c) From 2-methoxy-6-methyl-9-chloroacridine, 2-methoxy-6-methyl-9-(α-diethylamino-δ-pentylamino)-acridine, the yellow dihydrochloride of which when crystallized from a mixture of methyl alcohol and ether decomposes at 242°.

For the production of 2-methoxy-6-methyl-9-chloroacridine, 4-methyl-2-chlorobenzoic acid is condensed with 4-anisidine to 4'-methoxy-3-methyl-diphenylamine-6-carboxylic acid (when crystallized from benzene melting at 182° C.), this compound is subjected to ring closure and chlorinated. The 2-methoxy-6-methyl-9-chloro-acridine, when crystallized from benzine, forms pale yellow colored needles, melting at 159–160° C.

(d) From 6-methyl-9-chloroacridine, 6-methyl-9-(α-diethylamino-δ-pentylamino)-acridine, the yellow dihydrochloride of which when crystallized from a mixture of methyl alcohol and ether decomposes at 220–222° C.

For the production of 6-methyl-9-chloroacridine, 4-methyl-2-chlorobenzoic acid is condensed with aniline to 3-methyl-diphenylamine-6-carboxylic acid (when crystallized from benzene melting at 176° C.) this compound is subjected to ring closure and chlorinated. The 6-methyl-9-chloro-acridine when crystallized from ether forms small nearly colorless crystals, melting at 120–121° C.

(e) From 2.6-dimethyl-9-chloroacridine, 2.6-dimethyl-9-(α-diethylamino-δ-pentylamino)-acridine, the yellow dihydrochloride of which when crystallized from a mixture of methyl alcohol and ether decomposes at 219–221° C.

For the production of 2.6-dimethyl-9-chloroacridine 4-methyl-2-chlorobenzoic acid is condensed with 4-toluidine to 3.4'-dimethyl-diphenylamine-6-carboxylic acid (when crystallized from benzene melting at 178° C.), this compound is subjected to ring closure and chlorinated. The 2.6-dimethyl-9-chloroacridine, when crystallized from benzine forms pale yellow colored needles melting at 128° C.

(f) From 6-methyl-2.9-dichloroacridine, 6-methyl-2-chloro-9-(α-diethylamino-δ-pentylamino)-acridine, the yellow dihydrochloride of which, when crystallized from a mixture of methyl alcohol and ether decomposes at 218–220° C.

For the production of 6-methyl-2.9-dichloroacridine, 4-methyl-2-chlorobenzoic acid is condensed with 4-chloro-aniline to 4'-chloro-3-methyl-diphenylamine-6-carboxylic acid (when crystallized from benzene melting at 203° C.), this compound is subjected to ring closure and chlorinated. The 6-methyl-2.9-dichloro-acridine crystallizes from chlorobenzene in small greenish yellow crystals and at a temperature above 200° C. decomposes gradually with the production of a dark coloration.

(g) From 2-ethyl-6.9-dichloroacridine, 2-ethyl-6-chloro-9-(α-diethylamino-δ-pentylamino)-acridine, the yellow dihydrochloride of which, when crystallized from a mixture of alcohol and ether, decomposes at 140° C.

For the production of 2-ethyl-6.9-dichloroacridine, 2.4-dichlorobenzoic acid is condensed with 4-ethylaniline to 4'-ethyl-3-chloro-diphenylamine-6-carboxylic acid (when crystallized from alcohol melting at 181° C.), this compound is subjected to ring closure and the condensation product chlorinated. The 2-ethyl-6.9-dichloro-acridine crystallizes from benzene in weak yellow colored needles of the melting point of 102° C.

*Example 12*

33.6 grams of 2-methoxy-6-chloro-phenoxyacridine (compare Example 9) are heated with 120 grams of phenol and 16.4 grams of N-(4-aminobenzyl)-acetamide in an oil bath at 120° C. during several hours. On pouring the mixture into 1000 ccs. of 2N-caustic soda lye the condensation product is precipitated as an orange yellow powder. In order to split off the acetyl radical 10 grams of the condensation product are boiled with 50 ccs. of concentrated hydrochloric acid and 50 ccs. of water during 3 hours. The hydrochloric acid salt of the 2-methoxy-6-chloro-9-(4'-amino-methyl-phenylamino)-acridine formed is recrystallized from 3 liters of boiling water. The reddish yellow monohydrochloride obtained is difficultly soluble in cold water and decomposes at 258° C.

The N-(4-aminobenzyl)-acetamide (from acetone-benzene white crystals of the melting point of 93–94° C.) is obtained by reduction of the corresponding 4-nitro compound by means of iron and acetic acid in the customary manner.

*Example 13*

30.6 grams of 2-isopropyloxy-6.9-dichloroacridine are mixed with 100 grams of phenol while heating on the water-bath. 16 grams of α-diethylamino-δ-aminopentane are added drop by drop. After heating for one hour at 100° C. the reaction mixture is poured into 1000 ccs. of 2- normal sodium hydroxide solution while stirring and the base precipitated is taken up with ether. The etheral solution is extracted by means of dilute aqueous acetic acid. From the acetic acid solution the 2-isopropyloxy-6-chloro-9-(α-diethylamino-δ-pentylamino)-acridine is precipitated by means of potassium carbonate in the form of the free base. The latter is taken up with ether and the citrate of the base precipitated by means of an ethereal solution of citric acid in the form of a yellow salt which is readily soluble in water.

The 2-isopropyloxy-6.9-dichloroacridine used as starting material forms yellow needles melting at 132–133° C. when recrystallized from ligroin. It is obtained by condensation of 4-isopropyloxy-aminobenzene boiling at 120° C. under 9 mm. pressure with 2.4-dichlorobenzoic acid, subjecting the 4'-isopropyloxy-3-chloro-diphenylamine-6-carboxylic acid formed (whitish needles melting at 187–188° C. when recrystallized from alcohol) to ring closure in the manner known per se and chlorination.

The 2-isopropyloxy-6-chloro-9-(para-diethylaminoethyl-ethylamino-phenylamino)-acridine is obtained when 23.5 grams of 4-amino-1-N-(ethyl-diethylaminoethyl)-aminobenzene, boiling at 170–172° C. under 7 mm. pressure, are used instead of α-diethylamino-δ-pentylamine in the above described process. The base dissolves in ether with a brown red coloration. From its ethereal solution a reddish brown hydrochloride is precipitated by means of an ethereal solution of hydrogen chloride.

2-isopropyloxy-6-chloro-9-(para-diethylaminoethoxyphenylamino)-acridine is obtained when using in the above described process 20.8 grams of 4-amino-1-diethylaminoethoxybenzene, boiling at 163–164° C. under 7 mm. pressure, as the amine compound. The base dissolves in ether with a yellow red coloration. The water-soluble orange brown hydrochloride is obtained from the ethereal solution by means of ethereal hydrogen chloride solution. 2-isopropyloxy-6-chloro-9-(para-diethylaminoethylmercapto-phenylamino)-acridine is obtained when using in the above described process 22.4 grams of 4-amino-1-diethylaminoethylmercapto-benzene, boiling at 149–150° C. under 1 mm. pressure, instead of α-diethylamino-δ-pentylamine. The base dissolves in ether with yellow red coloration and forms an orange colored water-soluble hydrochloride.

2-isopropyloxy-6-bromo-9-(α-diethylamino-β,β-dimethyl-γ-propylamino)-acridine is obtained by reacting upon 2-isopropyloxy-6-bromo-9-chloroacridine with α-diethylamino-β,β-dimethyl-γ-propylamine in the manner described above. Its hydrochloride forms a yellow water-soluble crystalline powder which decomposes above 155° C.

The 2-isopropyloxy-6-bromo-9-chloroacridine used as starting material in this case forms yellow crystals melting at 115–117° C. when recrystallized from ligroin. It is obtained by condensing 4-isopropyloxy-1-aminobenzene with 2-chloro-4-bromobenzoic acid, subjecting the 4'-isopropyloxy-3-bromo-diphenylamine-6-carboxylic acid formed (whitish crystals melting at 196–197° C. when recrystallized from alcohol) to ring closure and chlorinating.

2-isopropyloxy-6-iodo-9-(α-diethylamino-β,β-dimethyl-γ-propylamino)-acridine is obtained by reacting upon 2-isopropyloxy-6-iodo-9-chloracridine with α-diethylamino-β,β-dimethyl-γ-propylamine and is advantageously precipitated in the form of its yellow citrate by the addition of an ethereal solution of citric acid to the ethereal solution of the acridine base.

The 2-isopropyloxy-6-iodo-9-chloroacridine used as starting material forms fine yellow needles melting at 93–94° C. when recrystallized from ligroin. It is obtained by condensing 4-isopropyloxy-1-aminobenzene with 2-chloro-4-iodo-benzoic acid in the manner known per se, subjecting the 4'-isopropyloxy-3-iodo-diphenylamine-6-carboxylic acid formed (crystals melting at 202° C. when recrystallized from benzene) to ring closure and chlorinating.

2-n-butyloxy-6-chloro-9-(α-diethylamino-δ-pentylamino)-acridine is obtained by reacting upon 2-n-butyloxy-6.9-dichloroacridine with α-diethylamino-δ-pentylamine in the manner described above. It forms a yellow citrate which is readily soluble in water. By the addition of ammonia, sodium carbonate or sodium hydroxide to the aqueous solution of the said citrate the free base is precipitated in the form of an oil. It dissolves readily in alcohol, ether, methylene chloride and benzene.

The 2-n-butyloxy-6.9-dichloroacridine used as starting material forms yellow crystals melting at 143–144° C. when recrystallized from a small quantity of benzene. It is obtained by condensing 4-butyloxy-1-aminobenzene with 2.4-dichloro-benzoic acid, subjecting the 4'-n-butyloxy-3-chlorodiphenylamine-6-carboxylic acid (whitish crystals melting at 178–179° C. when recrystallized from alcohol) to ring closure and chlorinating.

2-n-butyloxy-6-chloro-9-(α-diethylamino-β-hydroxy-γ-propylamino)-acridine is obtained by reacting upon the aforementioned 2-n-butyloxy-6.9-dichloroacridine with α-diethylamino-β-hydroxy-γ-propylamine. It forms a yellow hydrochloride which dissolves in water with a greenish fluorescence.

2-n-butyloxy-6-methyl-9-(α-diethylamino-γ-butylamino)-acridine is obtained by reacting upon 2-n-butyl-oxy-6-methyl-9-chloroacridine with α-diethylamino-γ-butylamine in the manner described above. Its hydrochloride forms yellow crystals decomposing at about 140° C.

The 2-n-butyloxy-6-methyl-9-chloroacridine used as starting material forms yellow crystals melting at 104–105° when recrystallized from ligroin. It is obtained by subjecting 4'-n-butyloxy-3-methyl-diphenylamine-6-carboxylic acid (whitish crystals melting at 153–154° C. when recrystallized from alcohol) to ring closure and chlorinating.

2-isoamyloxy-6-chloro-9-(α-diethylamino-δ-pentylamino)-acridine is obtained by reacting upon 2-isoamyloxy-6.9-dichloroacridine with α-diethylamino-δ-pentylamine in the manner described above. Its hydrochloride forms a yellow powder which readily dissolves in water.

The 2-isoamyloxy-6.9-dichloroacridine used as starting material forms yellowish crystals melting at 143–144° C. when recrystallized from ligroin. It is obtained by reacting upon 4-isoamyloxy-1-aminobenzene (boiling at 148–150° C. under 10 mm. pressure) with 2.4-dichlorobenzoic acid, subjecting 4'-isoamyloxy-3-chloro-diphenylamine-6-carboxylic acid formed (yellowish green needles melting at 181–182° C. when recrystallized from alcohol) to ring closure and chlorinating.

2-isoamyloxy-6-chloro-9-(α-diethylamino-β-hydroxy-γ-propylamino)-acridine is obtained by reacting upon the aforementioned 2-isoamyloxy-6.9-dichloroacridine with α-diethylamino-β-hydroxy-γ-propylamine in the manner described above. Its hydrochloride decomposes at about 150° C.

2-hexyloxy-6-chloro-9-(α-diethylamino-δ-pentylamino)-acridine is obtained by reacting upon 2-hexyloxy-6.9-dichloroacridine with α-diethylamino-δ-pentylamine in the manner described above. Its citrate forms a yellow powder which is readily soluble in water same as, for instance, the formiate, acetate, tartrate and lactate.

The 2-hexyloxy-6.9-dichloro-acridine used as starting material forms a light yellow crystalline powder melting at 124–125° C. when recrystallized from ligroin or benzene. It is obtained by condensing 4-hexyloxy-1-aminobenzene (boiling at 158–160° C. under 10 mm. pressure) with 2.4-dichloro benzoic acid, subjecting the 4'-hexyloxy-3-chloro-diphenylamine-6-carboxylic acid formed (whitish crystals melting at 144–145° C. when recrystallized from alcohol) to ring closure and chlorinating.

2-hexyloxy-6-chloro-9-(β-N-piperidylethylamino)-acridine is obtained when reacting upon the aforementioned 2-hexyloxy-6.9-dichloroacridine with N-piperidylethylamine (Ber. der deutschen Chem. Ges. 24 (1891), page 1121).

2-hexyloxy-6-chloro-9-(α-diethylamino-β-hydroxy-γ-propylamino)-acridine is obtained by reacting upon the aforementioned 2-hexyloxy-6.9-dichloroacridine with α-diethylamino-β-hydroxy-γ-propylamine in the manner described above. Its yellow hydrochloride, hydrobromide and hydroiodide are relatively difficultly soluble in water. They decompose at about 130–135° C.

2-isooctyloxy-6-chloro-9-(α-diethylamino-δ-pentylamino)-acridine is obtained by reacting upon 2-isooctyloxy-6.9-dichloroacridine with α-diethylamino-δ-pentylamine in the manner described above. It forms a yellow citrate which is readily soluble in water.

The 2-isooctyloxy-6.9-dichloroacridine used as starting material is obtained by condensing 4-isooctyloxy-1-aminobenzene (boiling at 160° C. under 5 mm. pressure) with 2.4-dichlorobenzoic acid, subjecting the 4'-isooctyloxy-3-chlorodiphenylamine-6-carboxylic acid formed (yellowish green crystal powder melting at 113° C. when recrystallized from ligroin) to ring closure and chlorinating.

2-decyloxy-6-chloro-9-(α-diethylamino-δ-pentylamino)-acridine is obtained by reacting upon 2-decyloxy-6.9-dichloroacridine with α-diethylamino-δ-pentylamine in the manner described above. It forms a yellow citrate which is readily soluble in water.

The 2-decyloxy-6.9-dichloroacridine used as starting material forms light yellow crystals melting at 104–105° C. when recrystallized from ligroin. It is obtained by condensing 4-decyloxy-1-aminobenzene (boiling at 212° C. under 14 mm. pressure and solidifying to a white crystal mass on cooling) with 2.4-dichloro-benzoic acid, subjecting the 4'-decyloxy-3-chloro-diphenylamine-6-carboxylic acid formed (whitish crystals melting at 115° C. when recrystallized from ligroin) to ring closure and chlorinating.

2-dodecyloxy-6-chloro-9-(α-diethylamino-δ-pentylamino)-acridine is obtained by reacting upon 2-dodecyloxy-6.9-dichloroacridine with α-diethylamino-δ-pentylamine in the manner described above. It forms a yellow citrate which is readily soluble in water.

The 2-dodecyloxy-6.9-dichloroacridine used as starting material forms yellowish crystals melting at 98–100° C. when recrystallized from ligroin. It is obtained by reacting upon 4-dodecyloxy-1-aminobenzene (boiling at 213° C. under 6 mm. pressure and solidifying to a white crystal mass on cooling) with 2.4-dichloro-benzoic acid, subjecting the 4'-dodecyloxy-3-chlorodiphenylamine-6-carboxylic acid formed (whitish crystals melting at 115–116° C. when recrystallized from alcohol) to ring closure and chlorinating.

*Example 14*

33.4 grams of 4'-isoamyloxy-3-chlorodiphenylamine-6-carboxylic acid (compare paragraph 15 of Example 13) and 21 grams of phosphorus pentachloride are heated in 200 ccs. of ether during 1 hour whereupon solution takes place. On concentrating the solution the acid chloride crystallizes in the form of a yellow precipitate which decomposes at 100–110° C.

35 grams of the acid chloride and 12 grams of α-diethylamino-β-aminoethane are heated to boiling in 100 ccs. of benzene while stirring. The benzene is then distilled off and the basically substituted acid amide is set free from the residue by the addition of aqueous caustic soda solution. It is obtained in the form of a viscous oil.

The amide thus obtained is heated with 3 times its quantity of phosphorus oxychloride during 4 hours in a boiling water bath. By and by a yellow brown solution with a strongly green fluorescence is obtained. The solution is poured on to ice, the 2-isoamyloxy-6-chloro-9-(β-diethylamino-ethylamino)-acridine is precipitated by the addition of ammonia and taken up in ether. The ethereal solution is extracted by means of dilute acetic acid solution and the base reprecipitated from the acetic acid solution by the addition of alkali or ammonia. The base forms a yellow hydrochloride melting above 250° C. It is readily soluble in water.

This is a continuation in part application of our copending applications for Letters Patent Serial Nos. 534,460, filed May 1, 1931, and 726,866, filed May 21, 1934.

We claim:—

1. Acridine derivatives of the formula:

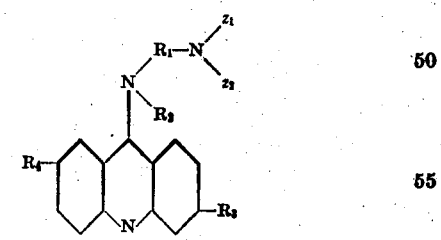

wherein $R_1$ stands for an organic radical selected from the group consisting of radicals of the alkylene and phenylalkylene series including those radicals the carbon chain of which contains as an interrupting member an atom selected from the group consisting of nitrogen, oxygen and sulfur atoms, $R_2$ stands for a substituent selected from the group consisting of hydrogen and alkyl, $z_1$ and $z_2$ stand for a substituent selected from the group consisting of hydrogen, alkyl, aminoalkyl, alkylaminoalkyl and alkylene, the latter group stand for $z_1$ and $z_2$ jointly, the group

being attached to $R_1$ at least once, $R_3$ stands for a substituent selected from the group consisting of alkyl groups and halogen atoms and $R_4$ stands for a substituent selected from the group consisting of hydrogen, halogen atoms, alkyl- and alkoxy groups, which acridine derivatives are light yellow crystalline substances, soluble in the usual organic solvents, insoluble in water and soluble in dilute acids, and are in the form of their salts with acids water-soluble, crystalline yellow products which decompose at a temperature of about 250° C.

2. Acridine derivatives of the formula:

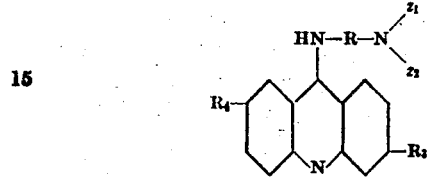

wherein R stands for an alkylene radical and $z_1$ and $z_2$ stand for a substituent selected from the group consisting of hydrogen, alkyl, aminoalkyl, alkylaminoalkyl and alkylene, the latter group standing for $z_1$ and $z_2$ jointly, $R_3$ stands for a substituent selected from the group consisting of alkyl groups and halogen atoms, $R_4$ stands for a substituent selected from the group consisting of hydrogen, halogen atoms, alkyl- and alkoxy groups, which acridine derivatives are light yellow crystalline substances, soluble in the usual organic solvents, insoluble in water and soluble in dilute acids, and are in the form of their salts with acids water-soluble, crystalline yellow products which decompose at a temperature of about 250° C.

3. Acridine derivatives of the formula:

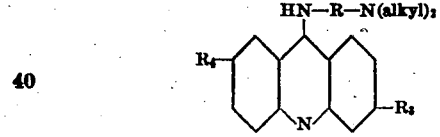

wherein R stands for an alkylene radical containing up to 5 carbon atoms, $R_3$ stands for a substituent selected from the group consisting of alkyl groups and halogen atoms, and $R_4$ stands for a substituent selected from the group consisting of hydrogen, halogen atoms, alkyl- and alkoxy groups, which acridine derivatives are light yellow crystalline substances, soluble in the usual organic solvents, insoluble in water and soluble in dilute acids, and are in the form of their salts with acids water-soluble, crystalline yellow products which decompose at a temperature of about 250° C.

4. Acridine derivatives of the formula:

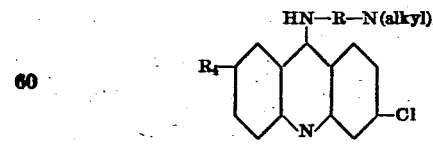

wherein R stands for an alkylene radical containing up to 5 carbon atoms, $R_4$ stands for a substituent selected from the group consisting of hydrogen, halogen atoms, alkyl- and alkoxy groups, which acridine derivatives are light yellow crystalline substances, soluble in the usual organic solvents, insoluble in water and soluble in dilute acids, and are in the form of their salts with acids water-soluble, crystalline yellow products which decompose at a temperature of about 250° C.

5. Acridine derivatives of the formula:

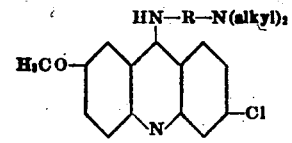

wherein R stands for an alkylene radical containing up to 5 carbon atoms, which acridine derivatives are light yellow crystalline substances, soluble in the usual organic solvents, insoluble in water and soluble in dilute acids, and are in the form of their salts with acids water-soluble, crystalline yellow products which decompose at a temperature of about 250° C.

6. Acridine derivatives of the formula:

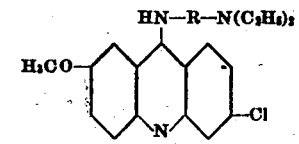

wherein R stands for an alkylene radical containing up to 5 carbon atoms, which acridine derivatives are light yellow crystalline substances, soluble in the usual organic solvents, insoluble in water and soluble in dilute acids, and are in the form of their salts with acids water-soluble, crystalline yellow products which decompose at a temperature of about 250° C.

7. The acridine derivative of the formula:

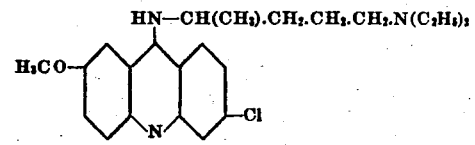

which is a light yellow crystalline substance, soluble in the usual organic solvents, insoluble in water and soluble in dilute acids, and is in the form of its dihydrochloride a yellow, crystalline product which decomposes at 248–250° C.

8. The acridine derivative of the formula:

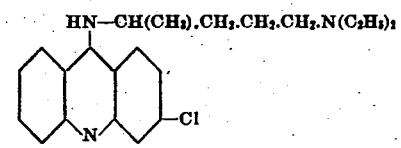

which is a light yellow crystalline substance, soluble in the usual organic solvents, insoluble in water and soluble in dilute acids, and is in the form of its dihydrochloride a yellow, crystalline product which decomposes at 234–236° C.

9. The acridine derivative of the formula:

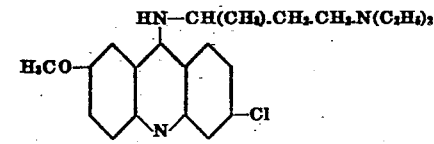

which is a light yellow crystalline substance, soluble in the usual organic solvents, insoluble in water and soluble in dilute acids, and is in the form of its dihydrochloride a yellow, crystalline product which decomposes at 258–260° C.

FRITZ MIETZSCH.
HANS MAUSS.